United States Patent
Gupta

(10) Patent No.: US 11,068,768 B1
(45) Date of Patent: Jul. 20, 2021

(54) PRE-STAGING TECHNOLOGY FOR SELF-SERVICE KIOSKS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/881,162

(22) Filed: May 22, 2020

(51) Int. Cl.
| | |
|---|---|
| G06K 19/077 | (2006.01) |
| G06K 19/07 | (2006.01) |
| G06Q 30/06 | (2012.01) |
| G06Q 20/28 | (2012.01) |
| G06Q 20/20 | (2012.01) |
| G06Q 20/34 | (2012.01) |

(52) U.S. Cl.
CPC .... *G06K 19/07711* (2013.01); *G06K 19/0719* (2013.01); *G06K 19/07709* (2013.01); *G06Q 20/204* (2013.01); *G06Q 20/28* (2013.01); *G06Q 20/341* (2013.01); *G06Q 30/0637* (2013.01)

(58) Field of Classification Search
CPC ......... G06K 19/07711; G06K 19/0719; G06K 19/07709; G06Q 20/204; G06Q 20/341; G06Q 20/28; G06Q 30/0637; G06Q 30/06; G06Q 20/10; G06F 17/60; G06F 17/00; G06F 17/20
See application file for complete search history.

(56) References Cited

U.S. PATENT DOCUMENTS

| | | | | |
|---|---|---|---|---|
| 4,614,861 A | * | 9/1986 | Pavlov | G06K 19/0719 235/380 |
| 4,697,072 A | * | 9/1987 | Kawana | G06Q 20/341 235/375 |
| 5,017,766 A | * | 5/1991 | Tamada | G07F 7/082 235/492 |
| 5,623,552 A | * | 4/1997 | Lane | G06K 13/073 382/124 |
| 6,052,675 A | * | 4/2000 | Checchio | G06Q 20/02 705/39 |
| 6,064,988 A | * | 5/2000 | Thomas | G06Q 20/105 705/38 |
| 7,490,758 B2 | * | 2/2009 | Drummond | G06Q 20/327 235/379 |
| 9,355,530 B1 | * | 5/2016 | Block | G06Q 20/1085 |
| 9,864,944 B2 | | 1/2018 | Radu et al. | |

(Continued)

*Primary Examiner* — Daniel I Walsh
(74) *Attorney, Agent, or Firm* — Weiss & Arons LLP; Michael A. Springs, Esq.

(57) ABSTRACT

Wait times at self-service kiosks may undermine the utility of these self-service machines. Self-service kiosks are configured to provide faster self-service kiosks that allow users to quickly perform common financial transactions. However, it has been increasing common for users to have to wait on a line to access a kiosk. Apparatus and methods are provided for a smart card that stages transactions by capturing the amount, pin and other necessary information on the smart card itself, before the user begins interacting with the kiosk. Information captured by the smart card may be transferred to the kiosk when the smart card is inserted into the kiosk. The user does not provide the kiosk with any additional information after inserted the smart card into the kiosk, thereby improving the transaction processing efficiency of the kiosk and enhancing user satisfaction.

15 Claims, 7 Drawing Sheets

(56) References Cited

U.S. PATENT DOCUMENTS

| | | | |
|---|---|---|---|
| 10,026,078 B1* | 7/2018 | Nolan | G06Q 20/3572 |
| 10,121,127 B1* | 11/2018 | Isaacson | G06Q 20/10 |
| 10,542,018 B1* | 1/2020 | Anderson | G07G 3/00 |
| 10,657,754 B1* | 5/2020 | Osborn | G07F 7/1008 |
| 10,692,059 B1* | 6/2020 | Thome | G06Q 20/3221 |
| 2002/0092914 A1* | 7/2002 | Pentz | G06K 19/041 |
| | | | 235/487 |
| 2002/0153424 A1* | 10/2002 | Li | G06K 19/06206 |
| | | | 235/492 |
| 2004/0124246 A1* | 7/2004 | Allen | G07F 7/1008 |
| | | | 235/492 |
| 2004/0238624 A1* | 12/2004 | Nakano | G07F 7/1008 |
| | | | 235/380 |
| 2007/0244830 A1* | 10/2007 | Hilderman | G06Q 20/425 |
| | | | 705/67 |
| 2007/0292006 A1* | 12/2007 | Johnson | G06Q 20/40 |
| | | | 382/124 |
| 2008/0052164 A1* | 2/2008 | Abifaker | G06Q 40/02 |
| | | | 705/14.27 |
| 2008/0210754 A1* | 9/2008 | Lovett | G06Q 20/24 |
| | | | 235/380 |
| 2009/0048971 A1* | 2/2009 | Hathaway | G07F 7/1008 |
| | | | 705/41 |
| 2009/0125440 A1* | 5/2009 | Maeng | G06Q 40/00 |
| | | | 705/38 |
| 2009/0272796 A1* | 11/2009 | Ong | G06Q 20/341 |
| | | | 235/379 |
| 2009/0328203 A1* | 12/2009 | Haas | G06F 21/6218 |
| | | | 726/20 |
| 2011/0022484 A1* | 1/2011 | Smith | G06Q 20/4016 |
| | | | 705/17 |
| 2011/0101095 A1* | 5/2011 | Bales, Jr. | G06Q 20/206 |
| | | | 235/382 |
| 2011/0137795 A1* | 6/2011 | Nambiar | G06Q 20/227 |
| | | | 705/43 |
| 2012/0011062 A1* | 1/2012 | Baker | G06Q 20/105 |
| | | | 705/41 |
| 2013/0212021 A1* | 8/2013 | Kingston | G06Q 20/227 |
| | | | 705/44 |
| 2013/0238497 A1* | 9/2013 | Ramachandran | G06Q 20/40 |
| | | | 705/41 |
| 2013/0254117 A1* | 9/2013 | von Mueller | G06Q 20/3829 |
| | | | 705/71 |
| 2014/0117100 A1* | 5/2014 | Black | G07F 19/20 |
| | | | 235/494 |
| 2014/0279490 A1* | 9/2014 | Calman | G06Q 20/40 |
| | | | 705/43 |
| 2016/0275760 A1* | 9/2016 | Block | G06Q 20/1085 |
| 2016/0350746 A1* | 12/2016 | Johnson | H04L 9/3239 |
| 2017/0132593 A1* | 5/2017 | Block | G06Q 20/32 |
| 2017/0262823 A1* | 9/2017 | Hartung | G06Q 20/401 |
| 2018/0005227 A1* | 1/2018 | Sandelov | G06Q 20/341 |
| 2018/0211253 A1* | 7/2018 | Ishikawa | G06Q 20/401 |
| 2019/0286805 A1 | 9/2019 | Law et al. | |
| 2019/0303917 A1* | 10/2019 | Locke | G06Q 20/352 |
| 2020/0034830 A1* | 1/2020 | Ortiz | G06Q 20/3678 |
| 2020/0364529 A1* | 11/2020 | Garrett | G06Q 20/341 |

* cited by examiner

PRE-STAGING TECHNOLOGY FOR SELF-SERVICE KIOSKS

FIELD OF TECHNOLOGY

Aspects of the disclosure relate to improving transaction efficiency and operation of self-service kiosks.

BACKGROUND OF THE DISCLOSURE

Wait times at self-service kiosks such as automated teller machines ("ATMs") and point-of-sale ("POS") terminals may detract from the utility of these kiosks. Self-service kiosks are deployed to allow users to quickly perform common transactions. However, it has been increasing common for users to have to wait on a line to access kiosk while other users complete their transactions at the kiosk.

A kiosk may be capable of processing a higher number of transactions per unit of time than a human teller. However, a kiosk transaction typically requires numerous inputs from a user before a transaction may be initiated and completed. For example, the kiosk may first require a user to insert a card, such as a debit or credit card, into the kiosk. The card may include account or other information that links the user to one or more financial accounts. Information stored on the card may include a unique identifier and username.

Based on the information stored on the card, the kiosk may prompt the user to enter a personal identification number ("PIN") associated with the card. The PIN may be used to authenticate the user at the kiosk. After authenticating the user, the kiosk may then prompt the user for inputs such as amount of money, an account selection or other transaction details. The prompting for transaction information by the kiosk, and the subsequent entry of a response by the user, all increase an amount of time each user may spend at the kiosk.

Other users may need to wait on a line while a prior user responds to the prompts and completes their desired transaction. The resulting lengthy wait time may increase user dissatisfaction and reduce a transaction processing efficiency of a kiosk.

Some technology solutions exist for reducing the number of kiosk prompts and user responses. However, these solutions typically require additional third-party hardware and services, such as a mobile device or a laptop/desktop. These solutions, in addition to increasing costs associated with obtaining the third-party hardware and services, also increase security risks. For example, a third-party device must be adequately secured to transmit and receive sensitive financial data. Communication channels between the third-party device and the kiosk must also need to be secured. Any sensitive data stored locally on the third-party device must be adequately secured to prevent unauthorized access to that data.

Accordingly, it would be desirable to reduce user wait-times at a self-service kiosk and improve the transaction efficiency of the kiosk without relying on third-party hardware or services. It would be further desirable to improve the transaction processing efficiency of a self-service kiosk without incurring the costs to procure and maintain third-party hardware or services. It would also be desirable to improve the transaction processing efficiency of a self-service kiosk without increasing security risks associated with introducing third-party hardware and services.

Accordingly, it is desirable to provide apparatus and methods for PRE-STAGING TECHNOLOGY FOR SELF-SERVICE KIOSKS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
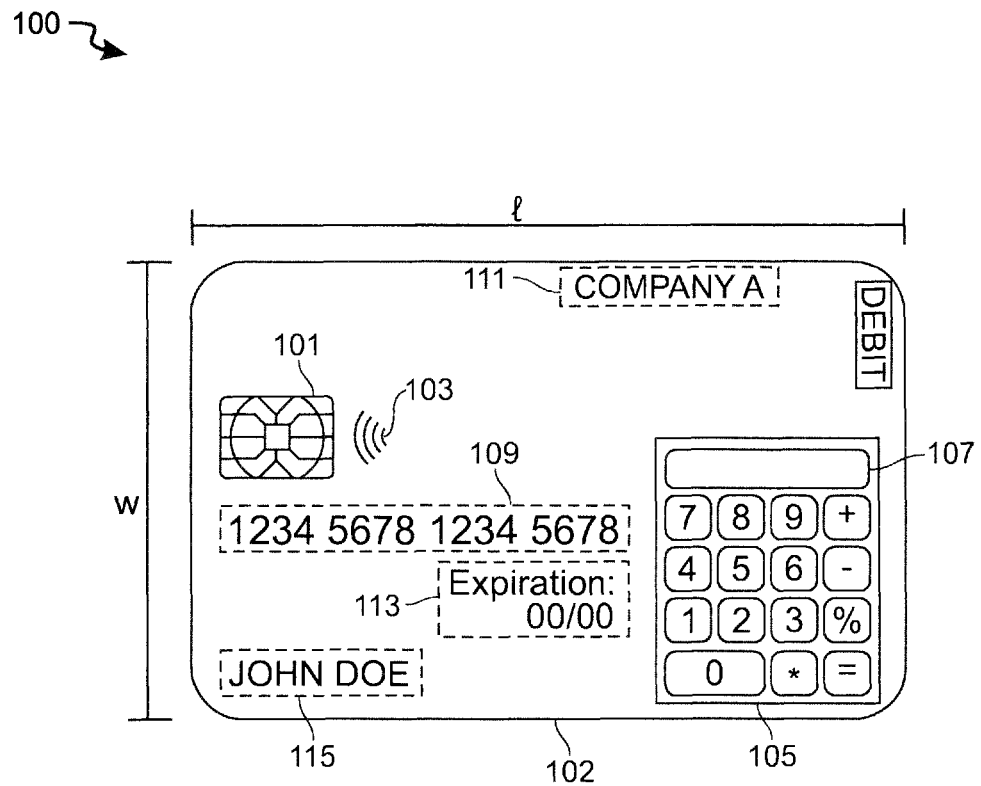
FIG. 1 shows illustrative apparatus in accordance with principles of the disclosure.
Figure 1:
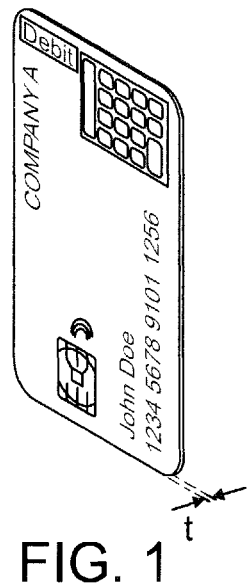

Apparatus for a smart card are provided. Apparatus may increase transaction processing efficiency of an ATM, point-of-sale ("POS") terminal or other self-service kiosks.

The smart card may include a microprocessor. The smart card may include various other components, such as a battery, a speaker, and antennas. The microprocessor may have a thickness that is not greater than 0.25 millimeters ("mm"). The microprocessor may control overall operation of the smart card and its associated components. The smart card may include RAM, ROM, an input/output ("I/O") module and a non-transitory or non-volatile memory.

The I/O module may include a microphone which may accept user provided audio input. The I/O module may include one or more of a speaker for providing audio output and a display for providing textual, audiovisual and/or graphical output.

Software may be stored within non-transitory memory and/or other storage media. The software may provide instructions to the microprocessor for enabling the smart card to perform various functions. For example, non-transitory memory may store software used by the smart card, such as an operating system, application programs, web browser and a database. Alternatively, some or all of computer executable instructions may be embodied in hardware or firmware components of the smart card.

Application programs may include computer executable instructions for invoking user functionality related to communication, authentication services, and voice input and speech recognition applications. Application programs may utilize one or more algorithms that encrypt information, process received executable instructions, interact with a kiosk, manage communication between the smart card and a kiosk, perform power management routines or other suitable tasks.

The smart card may include a pressure sensitive button. The pressure sensitive button may have a thickness that is not greater than 0.8 mm. The pressure sensitive button may be actuated by a user to activate the smart card. For example, actuating the pressure sensitive button may activate the microprocessor, keypad or communication interface of the smart card.

In some embodiments, the smart card may be activated in response to receiving high frequency wireless signals. The high frequency signals may be detected by a communication interface of the smart card. High frequency signals may be broadcast by a kiosk. For example, a kiosk may include a near field communication ("NFC") reader that broadcasts high frequency signals. High frequency signals may provide power to one or more components of the smart card. In some embodiments, in response to receiving the power, the microprocessor may be activated and begin to draw power from a battery on the smart card.

The smart card may operate in a networked environment. The smart card may support establishing communication channels with one or more kiosks. The smart card may connect to a local area network ("LAN"), a wide area network ("WAN") or any suitable network. When used in a LAN networking environment, the smart card may be connected to the LAN through a network interface or adapter. The communication interface may include a network interface or adapter.

When used in a WAN networking environment, the smart card may include a modem or other means for establishing communications over a WAN, such as the Internet. The communication interface may include the modem. The existence of any of various well-known communication protocols such as TCP/IP, Ethernet, FTP, HTTP and the like is presumed.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, multiprocessor systems, microcomputers, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

The smart card may include one or more batteries. A battery of the smart card may be flexible. The battery may be a power source for electronic components of the smart card. For example, the battery may supply power to a keypad, a communication interface and the microprocessor. The battery may have a thickness that is not greater than 0.5 mm.

The battery may be recharged via an electrical contact when the smart card is inserted into a card-reader of a kiosk. The smart card's power source may include high frequency signals received from a kiosk. The smart card may be configured to utilize received high frequency signals to recharge the battery or provide power to other components of the smart card.

The smart card may include an electrical contact. An electrical contact may be constructed using any suitable material that conducts or transfers electricity. The smart card may include a plurality of electrical contacts. An electrical contact may be accessible on any suitable face of a housing of the smart card. The contact may be accessible through a thickness of the housing. The contact may be utilized to transfer electrical charge to the rechargeable battery when the smart card is inserted into a kiosk card reader.

The smart card may include a communication interface. The communication interface may have a thickness that is not greater than 0.8 mm. The communication interface may include a circuitry for establishing communication with a kiosk. The communication interface may be configured to implement protocols for wireless communication. The communication interface may include a wireless circuit. The communication interface may be configured to implement protocols for wired communication.

The wireless circuit may include software and/or hardware for establishing a wireless communication channel with the kiosk. Such protocol may include Wi-Fi, Bluetooth, Ethernet, NFC, satellite and cellular telecommunications. Wi-Fi may include passive Wi-Fi with lower power consumption than typical Wi-Fi. The smart card may be configured to communicate using a typical Wi-Fi range such as 150-300 ft. when searching for available kiosk wireless communication channel.

A communication interface of the smart card may include an NFC chip. The NFC chip may communicate over a typical NFC communication range (~2 in.) when transmitting or receiving sensitive data. An illustrative NFC chip may utilize a 13.56 MHz radio frequency. A microprocessor or the smart card may be configured to dynamically limit or expand transmitting and receiving ranges. The microprocessor may dynamically limit or expand transmitting and receiving ranges in response to a detected location of the smart card.

For example, the microprocessor may expand a communication range when the smart card is within a "familiar" zone. Expanding a communication range may include using a Wi-Fi communication channel rather than an NFC communication channel. A familiar zone may be a pre-defined radius from a user's home or work location. The microprocessor may limit a communication range when the smart card is within an "unknown" zone. For example, the microprocessor may limit a communication range when the user is travelling beyond the radius that defines the familiar zone. The microprocessor may restrict the smart card to using NFC or contact-based communication channels when in an unknown zone.

In some embodiments, the smart card may be activated in response to receiving wireless signals from the kiosk. The wireless signals may provide power to one or more components of the smart card. For example, in response to receiving power via the wireless signals, a microprocessor of the smart card may be activated. Illustrative wireless signals may include NFC signals.

smart card may include an electrical contact that may be used to establish a wired or contact based connection to the kiosk. For example, the smart card may include an "EMV" chip. EMV is a technology that derives its name from the companies (Europay, MasterCard, and Visa) that helped develop the technology. When an EMV chip is inserted into a specialized card reader, the reader powers the EMV chip and the EMV chip generates a new authorization code each time it is used to authorize a transaction. Thus, simply copying information printed on the face of the smart card or encoded on a magnetic stripe may be insufficient to initiate a fraudulent transaction.

The EMV chip may function as an electrical contact. The EMV chip may include software and/or hardware for establishing a wired communication channel with the kiosk. The battery of the smart card may be recharged via the at least one electrical contact when the smart card is in contact with the kiosk via the EMV chip.

The smart card may include a housing. The housing may provide a protective layer for internal components of the smart card. For example, the microprocessor may be embedded in and protected by the housing. The housing may be flexible. The housing may be constructed from plastic or other suitable materials. The housing may define a form factor of the smart card.

For example, a kiosk may include a card reader constructed to receive a card that conforms to a predefined form factor. As illustrative form factor is defined in specifications published by the International Organization for Standardization ("ISO"). Illustrative specifications may include ISO/IEC 7810, ISO/IEC 7811 and ISO/IEC 7816, which are hereby incorporated herein by reference in their respective entireties.

The smart card may include a keypad. The keypad may include mechanical keys. The keypad may be mounted on an outside of the housing. The housing of the smart card may conform to the predefined form factor. For example, the housing and the keypad mounted on an outside of the housing may collectively have a thickness that is not greater than 0.8 mm and a surface area that is not greater than 86 mm×54 mm.

The kiosk may utilize information stored on the smart card to authenticate a user at the kiosk. In addition to information stored on the smart card, the kiosk may prompt the user for additional information before allowing the user to initiate a transaction at the kiosk. The additional information may include a PIN or biometric feature. After authenticating the user, the kiosk may allow the user to initiate a transaction at the kiosk. Illustrative transactions may include withdrawing cash, transferring funds between accounts or depositing cash/checks.

The smart card may include non-transitory memory locations within the housing. The microprocessor may access such memory locations. The non-transitory memory may be included in the microprocessor. The non-transitory memory locations may store machine readable instructions, that when executed by the microprocessor, cause the smart card to perform various functions. For example, the microprocessor, by executing the machine-readable instructions, may instruct the communication interface to scan for a wired or wireless communication channels and connect to a detected kiosk.

The smart card may include a keypad. The keypad may be mounted on an outside of the housing. The keypad may include mechanical keys. The keypad may not increase the form factor of the smart card, as defined by a card reader of a kiosk for receiving the smart card. A user of the smart card may enter data using the keypad. The data entered by the user may be captured by the microprocessor. The data entered by the user via the keypad may include authentication information that would typically be requested by the kiosk when authenticating the user. The data entered by the user via the keypad may include transaction information that would typically be requested by the kiosk to initiate a transaction on behalf of the user.

The keypad may allow the user to enter data into the smart card that will be needed by the kiosk before accessing the kiosk. Entering the data into the smart card beforehand may reduce an amount of time the user spends entering data when accessing the kiosk. Reducing the amount of time the user spends entering data at the kiosk may reduce the amount of time other users spend waiting for access to the kiosk. Reducing the amount of time the user spends entering data at the kiosk may increase the number of transaction that the kiosk may process per unit of time. Thus, reducing the amount of time the user spends entering data at the kiosk may increase the transaction processing efficiency of the kiosk.

Data entered using the keypad may include authentication information that would typically be requested by a kiosk before providing a user access to one or more services of the kiosk. For example, the user may enter a PIN or biometric feature. The authentication information may be encrypted and stored on the smart card. After capturing the authentication information, the smart card may present the authentication information to the kiosk without requiring any further input from the user.

Data entered using the keypad may include transaction information that would typically be requested by a kiosk before implementing one or more services of the kiosk. For example, using the keypad the user may enter a cash withdrawal amount before reaching the kiosk. The smart card may present the entered withdrawal amount to the kiosk without requiring any further input from the user. The smart card may instruct the kiosk to execute the withdrawal transaction without requiring any further input from the user.

Other illustrative data that may be entered via the keypad may include a user's name, an expiration date of the smart card, an amount, a currency, a card verification value ("CVV") or any other suitable data. The user may enter information such as a telephone number, address or zip code. Such information may be used to authenticate the user.

In some embodiments, data entered using the keypad may be transferred to the kiosk when the smart card is inserted into or otherwise in communication with the kiosk. In some embodiments, data entered using the keypad may be transferred to the kiosk before the user inserts the smart card into the kiosk. Information transferred from the smart card to the kiosk may be utilized by the kiosk to complete transaction details that would have otherwise required prompting the user for inputs at the kiosk. Capturing the data on the smart card before the user accesses the kiosk reduces the amount of time a user needs to spend entering data at the kiosk, thereby increasing the transaction processing efficiency of the kiosk.

The microprocessor may capture data entered using the keypad. The microprocessor may encrypt the captured data. The smart card may include a dedicated encryption controller for performing the encryption. The microprocessor may store the encrypted data locally on the smart card.

The microprocessor may formulate a set of transaction instructions executable by the kiosk. The transaction instructions executable by the kiosk may be formulated based on the data (e.g., transaction and authentication information) captured by the keypad. For example, the microprocessor may formulate transaction instructions for executing a transaction at the kiosk. The microprocessor of the smart card may integrate data captured from the keypad into the transaction instructions executable by the kiosk.

The smart card may transfer transaction instructions to the kiosk. The smart card may transfer transaction instructions in response to establishing a communication channel with the kiosk. The communication interface may be used to establish the communication channel linking the smart card and the kiosk. For example, the smart card may establish the communication channel when the smart card is inserted into a card reader of the kiosk. The kiosk may autonomously initiate a transaction based on transaction/authentication information or transaction instructions received from the smart card, thereby improving the transaction processing efficiency of the kiosk.

For example, using the keypad, the user may enter a PIN and withdrawal amount into the smart card. The smart card may formulate a withdrawal request for the amount entered by the user. The smart card may formulate the withdrawal request before the user inserts the smart card into the kiosk.

The smart card may include a communication interface that includes a wireless communication interface. The smart card may scan for a wireless communication channel broadcast by the kiosk. The smart card may attempt to establish a connection to the kiosk using the detected wireless communication channel. The smart card may establish the wireless communication channel to the kiosk before the smart card is inserted into a card reader of the kiosk.

The wireless communication channel may only be used for transferring transaction instructions previously formulated by the smart card. In response to receiving the transaction instructions, the kiosk may initiate pre-processing of the user's desired transaction defined in the transaction instructions.

Pre-processing may include verifying authentication information included in the transaction instructions. Pre-processing may include verifying that the user has sufficient funds available to warrant dispensing cash to the user. The pre-processing may determine that further input is needed from the user before dispensing cash or otherwise executing transaction instructions received from the smart card.

For example, a user's account or kiosk location may be associated with a specific fraud-mitigating protocol. The fraud-mitigating protocol may require a user to provide additional authentication information or verify previously provided authentication information before the kiosk executes transaction instructions received from the smart card.

The kiosk may complete pre-processing of the transaction before the user approaches the kiosk and inserts the smart card into the kiosk. The kiosk, in response to detecting that the smart card has been inserted into the kiosk, may determine that it has pre-processed transaction instructions associated with the smart card. In response to detecting insertion of the smart card, the kiosk may then execute the transaction embodied in the transaction instructions.

From a perspective of the user, the transaction may be executed in real time after the smart card is inserted into the kiosk. For example, if transaction instructions correspond to a withdrawal request, in response to inserting the smart card into the kiosk, the kiosk may provide the requested cash to the user.

In some embodiments, transaction instructions formulated by the microprocessor and stored locally on the smart card may not be transferred to the kiosk before the smart card is inserted into the kiosk. Such embodiments may provide an additional layer of fraud-mitigation by reducing the possibility that the set of transaction instructions will be intercepted during wireless transmission to the kiosk.

Transaction instructions may be transferred to the kiosk using a contact-based communication channel. An EMV chip may be used to establish a contact-based communication channel. When transaction instructions are received by the kiosk, the kiosk may verify authentication information included in the transaction instructions and implement a requested transaction.

In some embodiments, the smart card may capture authentication information. The smart card may encrypt the authentication information and transfer the authentication information to the kiosk. The kiosk may therefore not prompt the user for authentication information after the smart card is inserted into the kiosk.

After the user inserts the smart card into the kiosk, the smart card may interact directly with the kiosk, without requiring any further authentication information from the user. The smart card may transfer locally stored authentication information to the kiosk in response to an authentication request submitted by the kiosk directly to the smart card.

After the kiosk authenticates the inserted smart card, the smart card may then transfer transaction instructions to the kiosk. The transaction instructions may be formatted in a fashion that is understandable for processing by the kiosk. The kiosk may autonomously decrypt the set of transaction instructions.

The kiosk may autonomously execute the transaction instructions and initiate a withdrawal transaction based on the withdrawal amount previously entered by the user. The transaction instructions formulated by the microprocessor may be sufficient to execute a transaction without the kiosk prompting the user for additional data. The kiosk may provide a requested amount of cash to the user without requiring the user to enter any information at the kiosk after inserting the smart card into the kiosk.

The smart card may encrypt selected data entered by the user. The kiosk may decrypt data it receives from the smart card. The selected data may be less than all of the data associated with a set of transaction instructions. For example, the smart card may only encrypt a PIN or other authentication information. In some embodiments, the smart card may encrypt all data entered by the user via the keypad.

Limiting the amount of data encrypted by the smart card may reduce power consumption of the smart card. Using less power may improve the functionality of the smart card by extending its battery life and extending the amount of time between charging.

Limiting the amount of data that is encrypted may improve functionality of the kiosk. The kiosk may only need to decrypt selected data and not an entire set of transaction instructions. This may speed up a response time of the kiosk when processing transactions instructions received from a smart card. Limiting the amount of data that needs to be decrypted by the kiosk may further increase the transaction processing efficiency of the kiosk per unit of time.

The microprocessor may be configured to delete data stored on the smart card after expiration of a pre-determined time period. For example, the microprocessor may delete transaction instructions from the smart card after expiration of a pre-determined time period.

The keypad of the smart card may have an inactive state. In the inactive state, the keypad may not capture data entered using the keypad. For example, in the inactive state, the microprocessor may not supply power to the keypad. In the inactive state, the microprocessor may not capture data entered using the keypad.

The keypad may have an active state. In the active state, the keypad may be capable of capturing data entered by a user. In the active state, the microprocessor may supply power to the keypad. In the active state, the microprocessor may capture and/or encrypt data entered by the user using the keypad.

The inactive state of the keypad may be a default state. When the keypad is in the inactive state, data entered using the keypad of the smart card is not captured by the microprocessor and will not be stored on the smart card. The microprocessor may toggle the keypad between the inactive and active states. For example, the microprocessor may activate the keypad in response to establishing or detecting a communication channel of a kiosk.

A system for increasing transaction processing efficiency of an ATM, POS terminal or other self-service kiosk is provided. The system may include a smart card having a thickness not greater than 0.8 mm. The smart card may have a width not greater than 54 mm. The smart card may have a length not greater 86 mm.

The system may include a communication interface. The communication interface may be embedded in the smart card. The communication interface may include hardware and software for communicating with a kiosk. For example, the smart card may include circuitry for communicating over Wi-Fi, NFC, Bluetooth, cellular, satellite or any suitable wireless network or protocol. The communication interface may include a wired communication interface. For example, the smart card may include circuitry and externally accessible electrical contact(s) for communicating over a wired Ethernet or any suitable wired network or protocol.

The system may include a microprocessor. The microprocessor may be embedded in the smart card. The microprocessor may control communication conducted using the communication interface. For example, the microprocessor may initiate communication with a kiosk using the communication interface. The microprocessor may terminate communication with the kiosk by turning off the communication interface. Turning off the communication interface may include disconnecting from a kiosk communication channel. Turning off the communication interface may include terminating an ongoing communication session with the kiosk. Turning off the communication interface may include cutting off power supplied to the communication interface.

The system may include a user input system. The user input system may be in electronic communication with the microprocessor. The user input system may include a keypad. The user input system may include an input controller. The input controller may capture data entered using the keypad. The user input system may include a voice controller. The voice controller may capture audio commands. The voice controller may generate an audio message confirming data captured by the input controller. The user input system may include an encryption controller. The encryption controller may encrypt data captured by the input controller and/or the voice controller.

The system may include machine executable instructions. The executable instructions may be stored in a non-transitory memory on the smart card. In some embodiments, the executable instructions may be stored in a non-transitory memory on the kiosk. The executable instructions may be transferred to the smart card using a communication channel established using the communication interface of the smart card.

The microprocessor may self-authenticate a user or the smart card. Self-authentication may be conducted over a communication channel established using the communication interface. The communication channel may be a secure communication channel linking the smart card and the kiosk.

The microprocessor may formulate transaction instructions executable by the kiosk. The transaction instructions may be formulated based on the encrypted data captured by the input controller and stored on the smart card. The transaction instructions may be transferred to the kiosk over a secure communication channel linking the smart card and the kiosk.

Transaction instructions may be formulated before a secure communication channel is established between the smart card and the kiosk. For example, a user of the smart card may enter data using the keypad when the user is at home. While at home, the smart card may not be within a communication range of a kiosk.

A kiosk may only establish a secure communication channel with the smart card when the smart card is within a threshold distance of the kiosk. When the smart card is within the threshold distance, the smart card may be likely or expected to access the kiosk. In some embodiments, the secure communication channel may only be established when the smart card initiates a request to establish a secure communication channel.

Transaction information or instructions stored locally on the smart card may be used to stage a transaction at the kiosk. A staged transaction may include all data needed to execute a transaction at the kiosk without requiring further input from a user. For example, all details of the transaction may be included in transaction instructions received from a smart card. The kiosk may require user confirmation before executing the staged transaction. Confirmation at the kiosk may verify that user is physically present at the kiosk before executing the staged transaction. Staging transactions at the kiosk improve the transaction processing efficiency of the kiosk by avoiding delays associated with the kiosk prompting for and, waiting to receive responses to, requests for additional transaction information.

For example, for a withdrawal transaction, the transaction instructions may include a PIN, the amount to be withdrawn and the account funds are to be withdrawn from. When the kiosk receives the transaction information/instructions, the kiosk may verify that the PIN is associated with the account. The kiosk may also verify that the account includes sufficient funds to fulfill the withdrawal request.

After conducting the verification, the kiosk may execute the transaction information/instructions. Thus, the user of the smart card may not need to input any additional information after the transaction information/instructions are transferred to the kiosk.

In some embodiments, after conducting verification of the PIN and sufficient funds, the kiosk may wait for a confirmatory instruction from the user before executing the transaction. For example, the kiosk may receive the transaction instructions over a wireless communication channel. The kiosk may receive the transaction instructions over the wireless communication when the smart card is outside a threshold distance from the kiosk. The kiosk may wait for a confirmation that the user is at the kiosk. The confirmation may include inserting the smart card into a card reader of the kiosk or establishing an NFC communication channel with the smart card.

A user of the smart card may enter data used to formulate the transaction instructions when the user is at home or at work. The transaction instructions may be transmitted to the kiosk over a Wi-Fi or cellular communication channel. Transaction information/instructions may be transmitted from the smart card to a target kiosk. For example, a target kiosk may be a kiosk at convenient location for the user. The transaction information/instructions may be transmitted to a cloud computer system. When the smart card establishes a wired connection to the kiosk, the kiosk may check whether transaction instructions associated with the smart card are stored in the cloud computing system.

In some embodiments, after storing transaction information/instructions locally on the smart card, a flag may be set on the smart card. The kiosk may be configured to check the flag and determine whether transaction information/instructions for a staged transaction have been generated by the smart card.

In some embodiments, the kiosk may require authentication before establishing a wired connection with the smart card. For example, the kiosk may require entry of the PIN or submission of a biometric feature before executing received transaction instructions.

Executing transaction instructions may reduce the number of user inputs required at the kiosk. Reducing the number of user inputs at the kiosk improves the transaction processing efficiency of the kiosk.

The microprocessor may purge transaction instructions when a kiosk does not establish a wired or contact-based communication channel with the smart card within a pre-determined time period. A cloud computing system may receive transaction instructions from the smart card at a first time. When a kiosk accessible to the cloud computing system does not establish a wired connection with the smart card by a second time, the cloud computing system may purge the transaction instructions. In some embodiments, the interval between the first and second times may be set by the cloud computing system.

The cloud computing system may assign a default interval to transaction instructions received from the smart card. The cloud computing interval may assign a longer or shorter time interval based on a distance between a location of the smart card transmitting the transaction information/instructions and a location of a kiosk. The system may use a machine leaning algorithm to determine an interval that provides sufficient time for the smart card user to travel to the kiosk.

The machine learning algorithm may take account of traffic patterns, time of day and typical user behavior. For example, if transaction information/instructions are received/generated closer to the end of a workday, the interval may be shorter than if the transactions instructions are received earlier in the workday.

The system may include a front controller. The front controller may be included in the kiosk. Using a kiosk communication channel, the front controller may receive encrypted input data from the smart card via the communication interface. The encrypted data may include transaction instructions. The transaction instructions may be received by the front controller from a cloud computing system.

The system may include a decryption controller. The decryption controller may be included in the kiosk. The decryption controller may decrypt encrypted data received by the kiosk from the smart card.

The system may include an input validation controller. The input validation controller may communicate with a remote computer server. The remote computer serer may be a cloud computing system. The remote computer server may validate the encrypted data received from the smart card. Validating the encrypted data may include verifying whether transaction instructions received from the smart card are associated with a valid PIN or other valid authentication information. Validating the encrypted data may include verifying whether transaction instructions are associated with sufficient funds for a specified account.

The system may include a payment dispatcher. The payment dispatcher may be included in the kiosk. The payment dispatcher may dispense cash or other items in response to a positive validation received from the input validation controller.

The smart card may include a wireless communication interface. The executable instructions stored in a non-transitory memory may scan for a wireless kiosk communication channel. A kiosk wireless communication channel may only be detectable when the smart card is within a threshold distance of a kiosk. For example, the kiosk wireless communication channel may be purposefully configured to have a maximum transmission range that is limited to a threshold distance from the kiosk.

In response to detecting the wireless kiosk communication channel, the smart card may transfer the encrypted data to the kiosk over the wireless kiosk communication channel. The kiosk may pre-stage a transaction based on transaction instructions included in the received encrypted data. The kiosk may execute the pre-staged transaction only after establishing contact-based communication with the smart card.

The executable instructions stored on the smart card may purge encrypted data stored on the smart card when contact-based communication with the kiosk is not established within a pre-determined time period. The kiosk may purge transaction instructions received from the smart card when contact-based communication is not established with the smart card within a pre-determined time period.

Apparatus for a smart card that improves transaction processing efficiency of an ATM, POS terminal or other self-service terminal is provided. The smart card may include a housing, a wireless interface, a microprocessor, a battery, and a keypad mounted on an outside of the housing. The housing and the keypad collectively have a thickness that is not greater than 0.8 mm.

The smart card may include a non-transitory memory that stores executable instructions, such as software or firmware. The executable instructions, when run by the microprocessor, may implement various functions of the smart card.

The microprocessor may detect that the smart card is at least 4 ft. away from a kiosk, such as a POS terminal. In response to detecting the position of the smart card relative to the kiosk, the microprocessor may activate a uni-directional communication capability of the wireless interface. Uni-directional communication capability may limit the wireless interface to receiving data from the kiosk. The uni-directional communication capability may not transmit any data to the kiosk.

When the uni-directional communication capability is active, the wireless interface may not transmit data stored locally on the smart card. Limiting the smart card to the uni-directional communication capability may limit exposure of sensitive financial or transaction information stored locally on the smart card to malicious networks or unauthorized access attempts.

The microprocessor may only activate the uni-directional communication capability for a predetermined time limit. Deactivating the uni-directional communication capability after expiration of the time limit may further limit exposure of sensitive information stored on the smart card to malicious networks or unauthorized access attempts.

The uni-directional communication capability, when active, may initiate a limited communication channel for receiving a request for transaction or authentication information from the kiosk. In response to receiving the request for information from the kiosk, the microprocessor may determine whether the requested information has been pre-authorized for transmission to the requesting kiosk.

For example, the smart card may be configured to release certain data to an ATM but not to a POS terminal. Transaction instructions stored on the smart card may have been specifically formulated for execution by an ATM. Other transaction instructions may have been specifically formulated for execution by a POS terminal or other kiosk.

A primary user may associate the smart card with limits (amount, specific products, merchant or location) using the keypad and restrict the smart card to transaction conducted in accordance with those limits. For example, the smart card may only be used for specific transactions at specific merchants during specific times. The smart card may only be used for transactions less than a threshold value.

Secondary users of the smart card may include a child using a card tied to a parent's (the primary user) account or a caregiver making purchases on behalf of a primary user. The second user may be restricted to using the smart card for transactions that conform to limits set by the primary user.

The primary user may enter limits using the keypad. The limits may be encrypted and stored locally on the smart card. The limits may be stored on a remote computer system. a kiosk may check with the remote computer system to determine whether a transaction complies with limits associated with the smart card.

When the requested information is pre-authorized (e.g., within limits set by a primary user) the microprocessor may activate the keypad. The microprocessor may only activate the keypad for a predetermined time limit. Deactivating the keypad after expiration of the time limit may limit exposure of the smart card to unauthorized inputs or access attempts.

When the keypad is active, the smart card may allow a user to enter transaction or authentication information needed to complete a desired transaction. When the requested transactional or authorization information is pre-authorized, the smart card may prompt a user to enter the requested information using the keypad. Exemplary requested information may include a PIN, a zip code or billing address associated with the smart card.

The microprocessor may encrypt information input using the keypad. After receiving and encrypting the entered information, the microprocessor may activate a bi-directional communication capability of the wireless interface. The microprocessor may only activate the bi-directional communication capability for a predetermined time limit. Deactivating the bi-directional communication capability after expiration of the time limit may limit exposure of the smart card to malicious networks or unauthorized access attempts.

The microprocessor may initiate a bi-directional communication channel with the kiosk. The microprocessor may instruct the wireless interface to transmit to the kiosk the requested information. The microprocessor may verify that data input by the user using the keypad conforms to the transaction or authentication information requested by the kiosk before transmitting the information to the kiosk using the bi-directional communication channel.

The microprocessor may transmit to the kiosk transaction instructions formulated in response to the informational request received from the kiosk. The transaction instructions may include the encrypted data input by the user. Upon receipt by the kiosk, transaction instructions may be sufficient to autonomously instruct the kiosk to execute a transaction without the kiosk prompting the user for any additional transaction or authentication information after receiving the transaction instructions.

Communication between the smart card and a kiosk may begin when the smart card is at least 4 ft. away from the kiosk. For example, the user of the smart card may be waiting on a line to access the kiosk. The smart card may formulate transaction instructions including any information requested by the kiosk before it is the user's turn to access the kiosk.

The transaction instructions may be transmitted to the kiosk when it is the user turn to access the kiosk. At that time, the kiosk may receive the transaction instructions which autonomously trigger execution of the user's desired transaction at the kiosk. Thus, when it is the user's turn to access the kiosk, the transaction desired by the user may be executed without the kiosk prompting for any additional information.

Such autonomous triggering of transactions at the kiosk may not require prompting for, or waiting to receive, user inputs when the user accesses the kiosk. Autonomously triggering a transaction at the kiosk may therefore improve the transaction processing efficiency of the kiosk by avoiding delays associated with the kiosk prompting for and, waiting to receive responses to, additional information after the user accesses the kiosk. Any required user inputs and information needed by the kiosk to execute a transaction may be formulated using the smart card before it is the user's turn to access kiosk (e.g., while waiting to access the kiosk).

The smart card may provide confirmation to a kiosk before autonomously triggers execution of a transaction at the kiosk using the captured data. Such confirmation may include establishing an NFC communication channel with the kiosk. The limited range (~2 in.) of an NFC communication channel may ensure that the user is present at the kiosk. The limited range of an NFC communication channel may ensure that it is the user's turn to access the kiosk when the kiosk executes received transaction instructions.

The confirmation may be provided by the user entering an authentication key sequence directly into the kiosk. For example, the user may enter a PIN into the kiosk to trigger a transfer of transaction instructions from the smart card to the kiosk. The confirmation may be provided by the user entering an authentication key sequence using a keypad of the smart card. For example, when it is the user's turn to access the kiosk, the user may enter an authentication key sequence using the keypad of the smart card. The smart card may transmit the authentication key sequence to the kiosk. Upon receipt of the authentication key sequence, the kiosk may execute the transaction instructions transmitted by the smart card.

In some embodiments, the user may enter an authentication key sequence using the keypad of the kiosk. The authentication key sequence may indicate that transaction instructions stored on the user's smart card are now ready for autonomous execution by the kiosk. The authentication key sequence may indicate that transaction instructions previously transmitted to the kiosk are now ready for autonomous execution because the user now has access to the kiosk.

Transactional confirmation may include the smart card establishing a contact-based communication channel with the kiosk. A contact-based communication channel may be established when the smart card is inserted into a card reader of the kiosk. Successfully establishing the contact-based communication channel may indicate that transaction instructions previously transmitted to the kiosk are now ready for autonomous execution because the user now has access to the kiosk. The smart card may be configured to transfer transaction instructions to the kiosk only after successfully establishing the contact-based communication channel.

The microprocessor may deactivate the wireless interface and the keypad after autonomously triggering execution of a transaction at the kiosk.

A system for improving transaction processing efficiency of an ATM, POS terminal or other self-service kiosk is provided. The system may include a smart card having a thickness not greater than 0.8 mm and a surface area not greater than 86 mm×54 mm. The smart card may include a wireless communication interface and a microprocessor.

The smart card may include a user input system in electronic communication with the microprocessor. The user input system may include a keypad and an input controller that captures data entered using the keypad. At a first location, the microprocessor may activate the keypad and the input controller. When activated, the keypad and the input controller may capture data input by a user of the smart card.

The smart card may include a voice controller. The voice controller may generate an audio message based on data input by the keypad and captured by the input controller. The user may actuate a key on the keypad to confirm the audio message. The smart card may include an encryption controller. The encryption controller may encrypt the input data captured by the input controller. The microprocessor may formulate transaction instructions for execution by the kiosk based on the data captured by the input controller.

The microprocessor may detect that the smart card is at a second location. For example, using the wireless interface, the microprocessor may detect that the smart card is within a wireless communication range of the kiosk. When the smart card is at the second location, the microprocessor may initiate a secure communication channel with the kiosk. The microprocessor may only initiate the secure communication channel when the smart card is at the second location and within the wireless communication range of the kiosk.

Using the secure communication channel, the microprocessor may self-authenticate the smart card to the kiosk. Self-authentication may include providing the kiosk with authentication information stored locally on the smart card. The self-authentication process may not prompt the user or otherwise request any input from the user. Illustrative authentication information may include a PIN, a biometric feature, password or any other credentials. In some embodiments, authentication information may be provided by the user during a process of entering transaction information such as while the user is waiting on a line to access the kiosk.

The kiosk may include an input validation controller. The input validation controller may communicate with a remote computer server. The input validation controller may submit authentication information to the remote service for validation.

In response to a successful self-authentication, the microprocessor may transfer transaction instructions stored on the smart card to the kiosk. The receipt of the transaction instructions by the kiosk may autonomously triggers execution of a transaction at the kiosk. Autonomously triggering the transaction at the kiosk may improve the transaction processing efficiency of the kiosk by avoiding delays associated with the kiosk prompting for and, waiting to receive responses to, additional information at a time the user accesses the kiosk. Any required user inputs and information needed by the kiosk to execute the transaction may be entered into the smart card before it is the user's turn to access kiosk (e.g., while waiting to access the kiosk).

The microprocessor may control the voice controller so that it only produces an audio message confirming data input by the user and captured by the input controller audio message when the smart card is at the first location. The first location may be the user's home or any other location within a familiar zone.

While at the first location, the user may enter data (using the keypad) for two or more transactions. The microcontroller and input controller may capture first input data for a first transaction. The microcontroller and input controller may capture second input data for a second transaction.

The microcontroller may formulate first transaction instructions based on the first input data. The microcontroller may formulate second transaction instructions based on the second input data. The microcontroller may store the first and second transaction instructions locally on the smart card.

The microcontroller may transfer the first transaction instructions to a first kiosk when the smart card is within a wireless communication range of the first kiosk. The microcontroller may transfer the second transaction instructions to a second kiosk when the smart card is within a wireless communication range of the second kiosk. The first and second kiosks may be at different locations. The first and second kiosks may provide different functions. For example, the first kiosk may be an ATM and the second kiosk may be a POS terminal.

The microprocessor may confirm that transaction instructions formulated based on user inputs conform to pre-defined limits associated with the smart card. The microprocessor may not transfer transaction instructions that exceed the limits to kiosk. The microprocessor may not store locally on the smart card transaction instructions that exceed the limits.

In some embodiments, the kiosk may include an input validation controller that communicates with a remote computer server and confirms that transaction instructions received from the smart card conform to pre-defined limits associated with the smart card. The remote computer server may reject any transaction instructions that exceed the limits associated with the smart card.

In some embodiments, a kiosk that receives transaction instructions from the smart card may check whether the received transaction instructions exceed the limits associated with the smart card. The kiosk may reject transaction instructions that exceed the limits.

Illustrative limits may include a requirement that the smart card and kiosk establish contact-based communication before the kiosk autonomously triggers execution of the transaction instructions received from the smart card. Illustrative limits may include only autonomously triggering execution of transaction instructions when a transaction is less than a maximum amount. Illustrative limits may include only autonomously triggering execution of transaction instructions for authorized products. Illustrative limits may include only autonomously triggering execution of transaction instructions at authorized merchants. Illustrative limits may include only autonomously triggering execution of transaction instructions at authorized locations.

The microprocessor may purge or delete transaction instructions stored locally on the smart card when the smart card does not transfer the transaction instructions to a kiosk within a pre-determined time period.

Methods for improving transaction processing efficiency of an ATM, a POS terminal or other self-service kiosk are provided. Methods may include capturing transaction limits entered by a primary user of a smart card using a keypad embedded in the smart card. Methods may include encrypting the transaction limits and storing the encrypted transaction limits locally in a secure location on the smart card.

Methods may include activating a secondary user mode of the smart card. Methods may include formulating transaction instructions when in the secondary user mode. The transaction instructions may be formulated based on data input using a keypad of the smart card.

Methods may include using a wireless interface of the smart card, detecting that the smart card is within a pre-defined wireless communication range of kiosk. Methods may include determining whether transaction instructions stored staged for execution by the kiosk conforms to the encrypted transaction limits stored locally in the secure location.

In response to confirming that the transaction instructions conform to the transaction limits, methods may include autonomously self-authenticating the smart card to the kiosk. In response to a successful self-authentication, methods may include triggering execution of the transaction instructions at the kiosk without requiring any input from the secondary user, thereby improving the transaction processing efficiency of the kiosk. Methods may include providing confirmation to a primary user of the smart card that transaction instructions have been autonomously triggered at a kiosk by the smart card on behalf of a secondary user.

Illustrative transaction limits may include a maximum amount that may be spent by the secondary user. Illustrative transaction limits may include authorized products that may be purchased by the secondary user. Illustrative transaction limits may include authorized merchants that may be patronized by the secondary user using the smart card. Illustrative transaction limits may include authorized locations where the smart card may be used by the secondary user.

Transaction limits may expire after a pre-determined time period. After expiration of the transaction limits, the kiosk may prompt the smart card for authorization before autonomously triggering execution of transaction instructions received from the smart card. After expiration of the transaction limits, methods may include deleting previously formulated and unexecuted transaction instructions stored locally on the smart card.

Methods for improving transaction processing efficiency of an ATM, POS terminal or other self-service kiosk are provided. Methods may include capturing transaction information using a keypad embedded in a smart card. Methods may include formulating transaction instructions based on the transaction information captured via the keypad.

Methods may include encrypting the transaction information. Methods may include storing encrypted transaction information locally on the smart card. Methods may include encrypting transaction instructions. Methods may include storing the encrypted transaction instructions locally on the smart card.

Methods may include transferring encrypted transaction instructions from the smart card to a kiosk. Transaction instructions may include transaction information, authentication information or other data entered by the user. Methods may include formulating a staged transaction at the kiosk based on the encrypted transaction information. A staged transaction may include transaction and authentication information needed for the kiosk to execute a transaction autonomously, without requiring additional user input. Methods may include executing the staged transaction without receiving any input from a user of the smart card after transferring the encrypted transaction instructions from the smart card to the kiosk.

In some embodiments, the smart card may encrypt transaction or authentication information entered by a user. Methods may include providing audio confirmation to the user of transaction or authentication information encrypted by the smart card. The audio confirmation may provide an audible articulation of the encrypted transaction information/instructions stored locally on the smart card. The user may provide an audio reply confirming the audio message. The user may enter confirmation of the audio message using the keypad.

Methods may include transferring encrypted transaction instructions from the smart card to the kiosk using a contact-based communication channel. Methods may include transferring the encrypted transaction instructions from the smart card to the kiosk using a wireless communication channel. The kiosk may formulate the transaction instructions based on the encrypted transaction information. In some embodiments, the smart card may transmit encrypted transaction or authentication information to the kiosk.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative smart card 100. Smart card 100 includes keypad 105. Keypad 105 may be used by a user of smart card 100 to enter data. Exemplary data may include transaction information such as an amount of cash the user wishes to withdraw from a kiosk. Transaction information may include a time or a time window when the user would like to withdraw the cash from the kiosk.

For example, using keypad 105, the user may enter "100." This information may represent an amount of funds (e.g., $100) the user wishes to withdraw from a kiosk. A currency of the funds may be automatically assigned based on a location of smart card 100. In some embodiments, keypad 105 may include currency keys for specifying the currency of the funds. Illustrative currency keys may include appropriate symbols for dollars ($), euros (€), yen (Y), pounds (£) or any suitable currency.

The user may also enter "1530." This transaction information may represent that the user wishes to withdraw the $100 after 2:30 pm. When the user specifies a time, the kiosk may not allow withdrawal of the $100 before 2:30 pm. In some embodiments, the user may not specify any time. Not specifying any time may indicate that the user wishes to be able to withdraw the funds at any time.

In some embodiments, the user may enter a time window. For example, the user may enter "1530-1430." This may indicate that the user only authorizes staged withdrawal of the $100 during between 2:30 pm and 4:30 pm. The kiosk may not allow withdrawal of $100 before 2:30 pm. The kiosk may not allow execution of the staged withdrawal of $100 after 4:30 pm. For example, smart card 100 may purge transaction information associated with the staged transaction after 4:30 pm. Smart card 100 may not push the transaction information to a kiosk before 2:30 pm or after 4:30 pm. Smart card 100 may also purge transaction information after it has been transferred to a kiosk.

Smart card 100 includes a microprocessor and other components for capturing, encrypting and storing the data entered by a user. Smart card 100 may also include executable instructions for packaging transaction information entered via keypad 105 into transaction instructions that may be executed by a kiosk. Smart card 100 may purge transaction instructions formulated based on the transaction instructions after they have been transferred to a kiosk.

FIG. 1 shows that smart card 100 also include chip 101. Chip 101 may provide an electrical contact that is accessible through housing 102. Chip 101 may provide an electrical contact for establishing a wired or contact based communication channel with a kiosk when card 100 is inserted into a card reader of the kiosk. Chip 101 may be an EMV chip.

Chip 101 may store a copy of transaction information printed on a face of smart card 100. For example, chip 101 may store card number 109, username 115, expiration date 113 and issuing bank 111. Chip 101 may also store encrypted authentication information. The encrypted authentication information may be utilized to provide a "second factor" method of authentication prior to executing a staged transaction.

For example, smart card 100 may package transaction information entered by user 115 via keypad 105 into transaction instructions. The transaction instructions may also include authentication information such as a PIN associated with smart card 100. The transaction instructions may be executable by a kiosk without requiring any further input from user 115. The transaction instructions may be transferred to the kiosk using wireless circuitry 103. In some embodiments, the transaction instructions may be transferred via chip 101.

After a kiosk receives transaction instructions, the kiosk may first determine whether the PIN included in the transaction instructions is associated with smart card 100. For example, the kiosk may communicate with a remote server and determine whether the received PIN is associated with username 115 and/or card number 109.

As a second factor method of authentication, the kiosk may determine whether the PIN included in the transaction instructions (and transferred to the kiosk) successfully unlocks encrypted security information stored on chip 101. In the PIN successfully unlocks the encrypted security information, the kiosk may execute the transaction instructions.

FIG. 1 also shows that smart card 100 has width w and length 1. Smart card 100 may be any suitable size. For example, width w may be 53.98 millimeters ("mm"). Length 1 may be 85.60 mm. Smart card 100 has a thickness t. An illustrative thickness may be 0.8 mm. An exemplary form factor of smart card 100 may be 53.98 mm×85.60 mm×0.8 mm. This exemplary form factor may allow smart card 100 to fit into a user's wallet or pocket. This exemplary form factor may allow smart card 100 to fit into a card reader of a kiosk.

Transaction information entered using keypad 105 may displayed on screen 107. Screen 107 may display messages to a user of smart card 100. Screen 107 may display a prompt for the user to enter authentication credentials or transaction information items. Screen 107 may display a prompt for the user to enter authentication information before formulating transaction instruction and/or before transmitting transaction instructions to a kiosk. Illustrative authentication information may include a PIN or biometric information. Screen 107 may also display confirmation that transaction instructions have been successfully save locally to smart card 100 or have transmitted to a kiosk.

Figure 2:
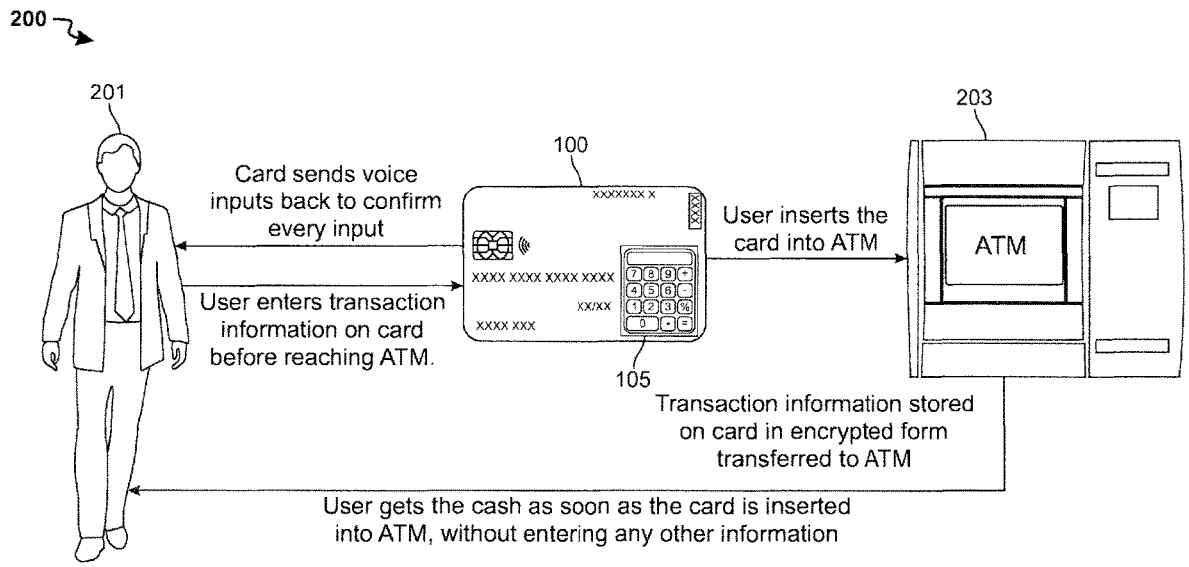
FIG. 2 shows an illustrative apparatus and scenario in accordance with principles of the disclosure.

FIG. 2 shows illustrative scenario 200. In scenario 200, user 201 may enter a withdrawal amount and PIN using keypad 105 of smart card 100. The data entered by user 201 may be encrypted and stored locally on smart card 100. Smart card 100 may include a speaker (not shown). The speaker may provide user 201 with audio confirmation of data entered using keypad 105. For example, the speaker may provide audio confirmation of the amount. In some embodiments, to maintain secrecy of a PIN, the speaker may not provide audio confirmation of the PIN. In some embodiments, to maintain secrecy of a PIN, the speaker may only provide audio confirmation of the PIN when smart card 100 in located within a familiar zone.

After entering the amount, PIN, account and any other data (e.g., transaction and authentication information), the data is encrypted and stored locally on smart card 100. Smart card 100 may include a specially designed memory location for securely storing transaction and authentication information.

In some embodiments, information stored locally on smart card 100 may be transferred to kiosk 203. Kiosk 203 may formulate transaction instructions based on the transaction and authentication information received from smart card 100. In some embodiments, a microprocessor on smart card 100 may be configured to formulate the transaction instructions executable by kiosk 203 based on the transaction and authentication information entered by user 201. No external hardware or software such as a mobile device, laptop or desktop device is needed to formulate transaction instructions. Transaction instructions may also be encrypted and securely stored locally on smart card 100.

The microprocessor of smart card 100 may also purge any locally stored information or transaction instructions that have not been transferred to kiosk 203 within a predetermined time window. Information or transaction instructions may be transferred to kiosk 203 when smart card 100 is inserted into a card reader (not shown) of kiosk 203.

Transaction/authentication information or transaction instructions may be transferred to kiosk 203 when smart card 100 is within a target distance of kiosk 203. Smart card 100 may include circuitry for conducting NFC communication. The target distance may correspond to being within range for conducting NFC communication. A typical NFC communication range is ~2 in.

In other embodiments, the microprocessor of smart card 100 may be configured to dynamically limit or expand wireless transmitting and receiving ranges. The microprocessor may dynamically limit or expand wireless transmitting and receiving ranges in response to detected location of smart card 100.

Smart card 100 may include a global positioning system ("GPS") chip for receiving and/or transmitting GPS signals. The microprocessor of smart card 100 may determine a current location of the smart card based on the received GPS signals. In other embodiments, the microprocessor of smart card 100 may determine a current location of the smart card based on signal triangulation or location information received from a kiosk.

After transaction/authentication information or transaction instructions stored locally on smart card 100 are transferred to kiosk 203, kiosk 203 executes a transaction based on the received information or instructions. FIG. 2 shows that for a withdrawal transaction, kiosk 203 provides user 201 with the requested amount of cash when smart card 100 is inserted or otherwise establishes communication with kiosk 203. User 201 will not have to input any information into kiosk 203 or use the screen or keyboard of kiosk 203. The process and apparatus shown in FIG. 2 will increase transaction efficiency of kiosk 203 by allowing kiosk 203 to process more transactions per unit of time.

Figure 3:
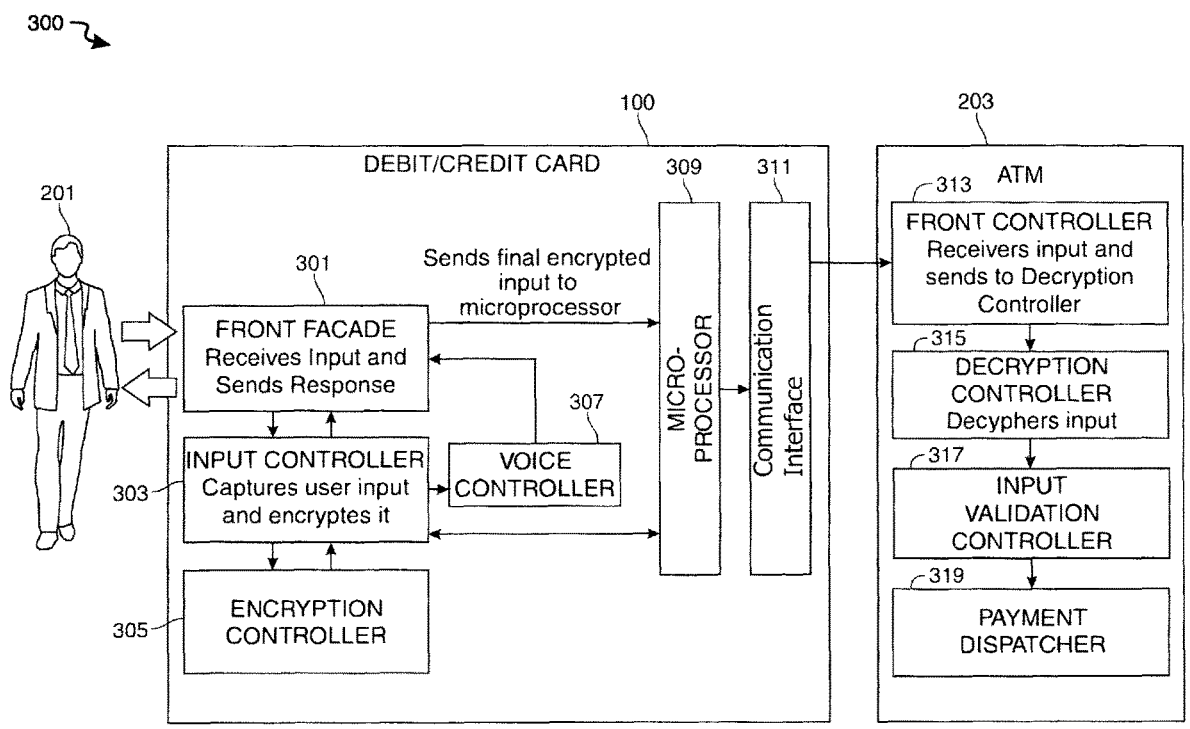
FIG. 3 shows illustrative apparatus in accordance with principles of the disclosure.

FIG. 3 shows illustrative components 300 of smart card 100 (shown in FIG. 1) and kiosk 203 (shown in FIG. 2).

FIG. 3 shows that smart card 100 includes front facade 301. Front facade 301 may include keypad 105 and a speaker (not shown) for receiving input and providing output to user 201. The speaker may be controlled by voice controller 307. Voice controller 307 may receive instructions from input controller 303.

Input controller 303 may capture data input by user 201 using keypad 105. Input controller 303 may encrypt the captured data. Input controller 303 may store captured data locally on smart card 100. Voice controller 307 may generate electrical impulses that when received by the speaker, audibly convey the data captured by input controller 303 to user 201.

Encryption of data captured by input controller 303 may be performed by encryption controller 305. Encryption controller 305 may encrypt the data using any suitable encryption algorithm. Illustrative encryption algorithms include RSA cryptography, Blowfish, AES, RC4, RC5, and RC6.

Smart card 100 may have limited power resources and may utilize an energy efficient encryption algorithm. An illustrative energy efficient encryption algorithm may include RC5, Skipjack and Secure IoT ("SIT").

SIT is a symmetric key algorithm that utilizes a 64-bit block cipher and requires 64-bit key to encrypt data. Typical symmetric key algorithms are designed to take an average of 10 to 20 encryption rounds to maintain a strong encryption process. Each encryption round utilizes mathematical functions to create confusion and diffusion. Generally, the more encryption rounds that are executed, the more secure the algorithm. However, the more encryption rounds that are executed also increase the amount of power consumed by the encryption algorithm.

To minimize power consumption, SIT is limited to just five encryption rounds and each encryption round includes mathematical operations that operate on 4 bits of data. To sufficiently secure the encrypted data, SIT utilizes a Feistel network of substitution diffusion functions such that encryption and decryption operations are very similar. The reduced number of encryption rounds is offset by the relatively long 64 bit key.

Microprocessor 309 may control overall operation of smart card 100 and its associated components. For example, microprocessor 309 may activate or deactivate keypad 105. When keypad 105 is active, input controller 303 may capture and encrypt data input using keypad 105. When keypad 105 is inactive, input controller 303 may not receive data from keypad 105. For example, in the inactive state, power may not be supplied to keypad 105.

In some embodiments, microcontroller may activate or deactivate input controller 303. When active, input controller 303 may capture and encrypt data input using keypad 105. When inactive, input controller 303 may disregard data input using keypad 105.

Microcontroller 309 may activate or deactivate any component of smart card 100. Based on detecting a communication channel associated with kiosk 203, microprocessor may activate one or more components of smart card 100. Microprocessor 309 may activate or deactivate components of smart card 100 based on a location of smart card 100. For example, microprocessor 309 may only activate keypad 105 or input controller 303 when smart card 100 is in a familiar zone. User 201 may define a familiar zone by inputting a zip code using keypad 105. Microcontroller 309 may deactivate keypad 105 or input controller 303 when smart card 100 is in an unknown zone. Smart card 100 may include a GPS chip for detecting a current location.

Smart card 100 also includes communication interface 311. Communication interface 311 may include a network interface or adapter. Communication interface 311 may include hardware and/or software for establishing a communication channel with kiosk 203. Communication interface 311 may be configured to implement protocols for wireless and/or wired communication with kiosk 203.

FIG. 3 also shows illustrative components of kiosk 203. Kiosk 203 includes front controller 313. Front controller 313 communicates with smart card 100 via communication interface 311.

Front controller 313 may include a network interface or adapter. Front controller 313 may include hardware and/or software for establishing a communication channel with smart card 100. Front controller 313 may be configured to implement protocols for wireless and/or wired communication with smart card 100.

Front controller 313 may receive transaction/authentication information and transaction instructions stored on smart card 101 via communication interface 311. Front controller 313 may establish a wired or contact based connection with smart card 101. For example, Front controller 313 may establish a wireless connection with smart card 100. Front controller 313 may include an NFC reader.

Front controller 313 may include a card reader for establishing a wireless connection with smart card 101. Front controller 313 may include circuitry for interacting with chip 101 (shown in FIG. 1) of smart card 100. Front controller 313 may include one or more read heads. The read head(s) may include a plurality of sub-heads that are positioned to extract information encoded on an EMV chip. The sub-heads may be positioned based on target chip locations as defined in ISO 7816, which is hereby incorporated herein by reference in its entirety.

Kiosk 203 includes decryption controller 315. Decryption controller 315 may decrypt information and transaction instructions received from smart card 101. The decrypted information or transaction instructions may be passed to input validation controller 317. Input validation controller 317 may connect to a remote computer server to validate transaction information or authentication information included in the transaction instructions received from smart card 100.

For example, input validation controller 317 may validate a PIN associated with user 201 and smart card 101. Input validation controller 317 may validate that an account associated with smart card 101 has an adequate balance to withdraw a requested amount included in the information/instructions.

After input validation controller 317 validates the information/instructions, input validation controller 317 may issue instructions to payment dispatcher 319. Payment dispatcher 319 may dispense the amount of cash requested by the information or transaction instructions (received from smart card 100) to user 201. Kiosk 203 does not require an input from user 201 after establishing communication with smart card 100 and receiving the information or transaction instructions stored on smart card 100.

Figure 4A:
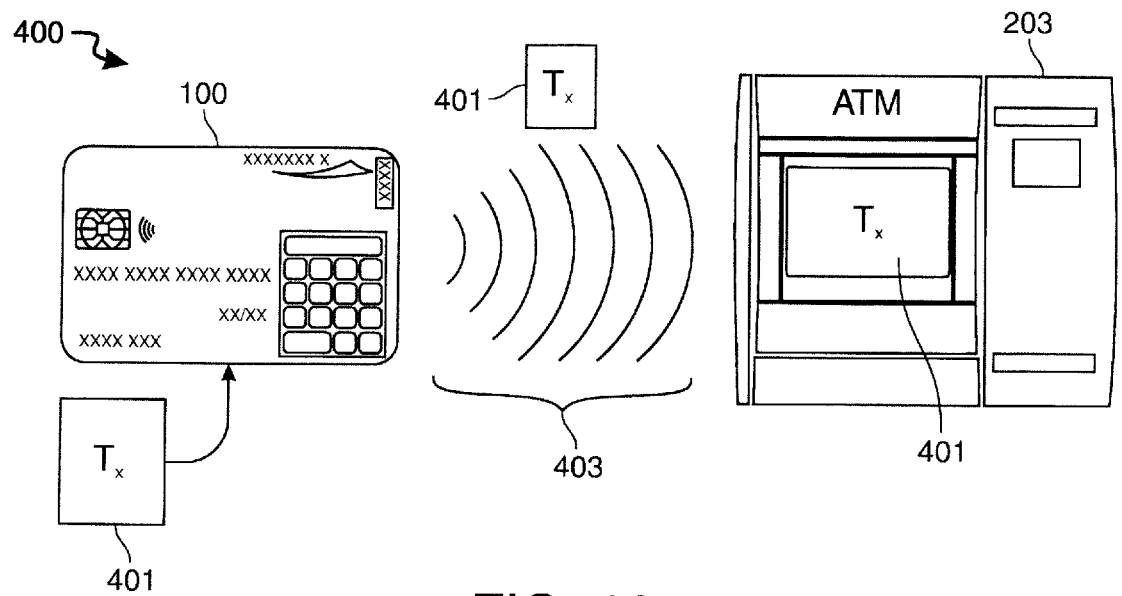
FIG. 4A shows an illustrative apparatus and scenario in accordance with principles of the disclosure.
Figure 4B:
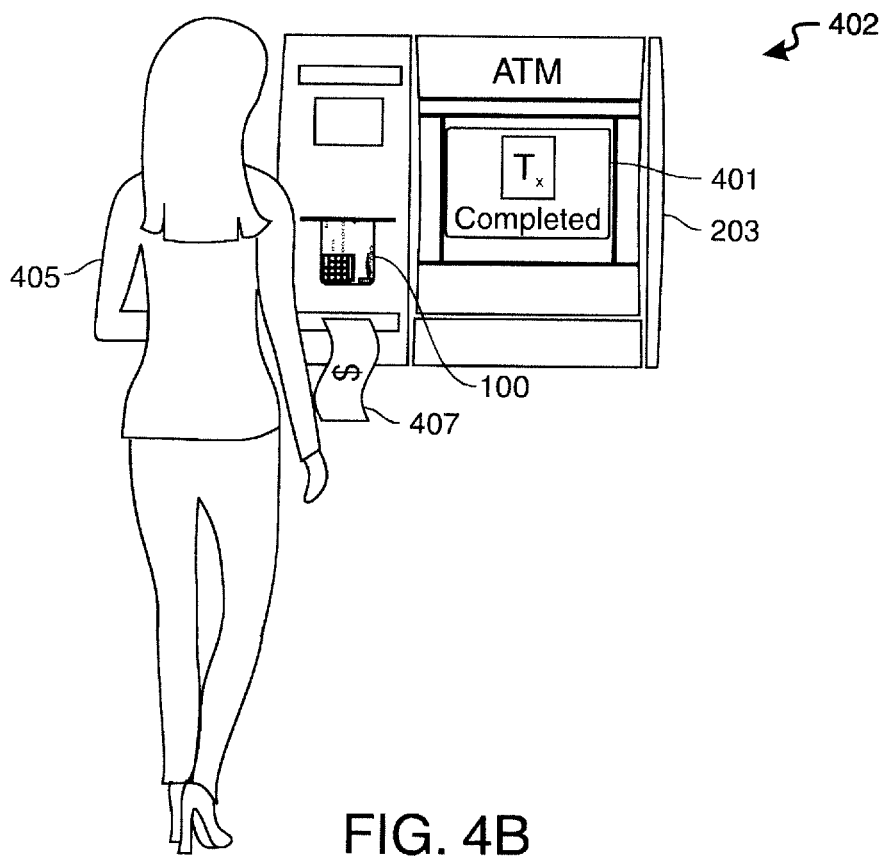
FIG. 4B shows an illustrative apparatus and scenario in accordance with principles of the disclosure.

FIGS. 4A-4B show illustrative scenarios 400 and 402. In scenario 400, user 405 has utilized keypad 105 of smart card 100 to enter transaction information that is stored locally on smart card 100. Smart card 100 may formulate transaction instructions 401 that are executable by kiosk 403. Transaction instructions 401 are stored locally on smart card 100.

Scenario 400 shows that smart card 100 and kiosk 203 communicate using communication channel 403. Communication channel 403 may be established when smart card is within a threshold distance of kiosk 203. For example, communication channel 403 may be an NFC channel established when smart card 100 and kiosk 203 are within a close proximity of each other.

In other embodiments, communication channel 403 may be a Wi-Fi communication channel. For example, user 405 may enter the transaction information from a comfort of their home. User 405 may pass kiosk 403 on the way to or home from work. Using a wireless network at home or work, user 405 may initiate a transfer of transaction instructions 401 to kiosk 203.

Transaction instructions 401 are transferred over communication channel 403 to kiosk 203. Scenario 400 shows that communication channel 403 is a wireless communication channel. In other embodiments, communication channel may be a wired or contact based communication channel.

FIG. 4B shows scenario 402. In scenario 402, user 405 has inserted smart card 100 into a card reader of kiosk 203. As discussed above, user 405 may have transferred transaction instructions 401 specifically to kiosk 203 because kiosk 203 is at a convenient location.

Transaction instructions 401 may include timing restrictions. The timing restrictions may limit execution of transaction instructions 401 to a time window defined by the timing restrictions. If transaction instructions 401 are not executed within the time window, kiosk 203 may delete transaction instructions 401. If transaction instructions 401 are not executed within the time window, smart card 100 may delete transaction instructions 401.

In scenario 402, user 405 inserts smart card 100 into kiosk 203. Kiosk 203 recognizes, based on the information stored on smart card 100, that transaction instructions 401 are associated with smart card 100. Kiosk 203 may recognize that transaction instructions 401 are associated with smart card 100 based on data encoded in an EMV chip or magnetic stripe of smart card 100. In some embodiments, when smart card 100 is inserted into kiosk 203, smart card 100 may inform kiosk 203 that transaction instructions 401 are ready to be executed by kiosk 203.

Scenario 402 shows kiosk 203 dispensing cash 407 to user 405. The amount of cash 407 is defined by transaction instructions 401. In scenario 402, kiosk 203 dispenses cash 407 to user 405 without user 405 entering any data at kiosk 203.

Figure 5A:
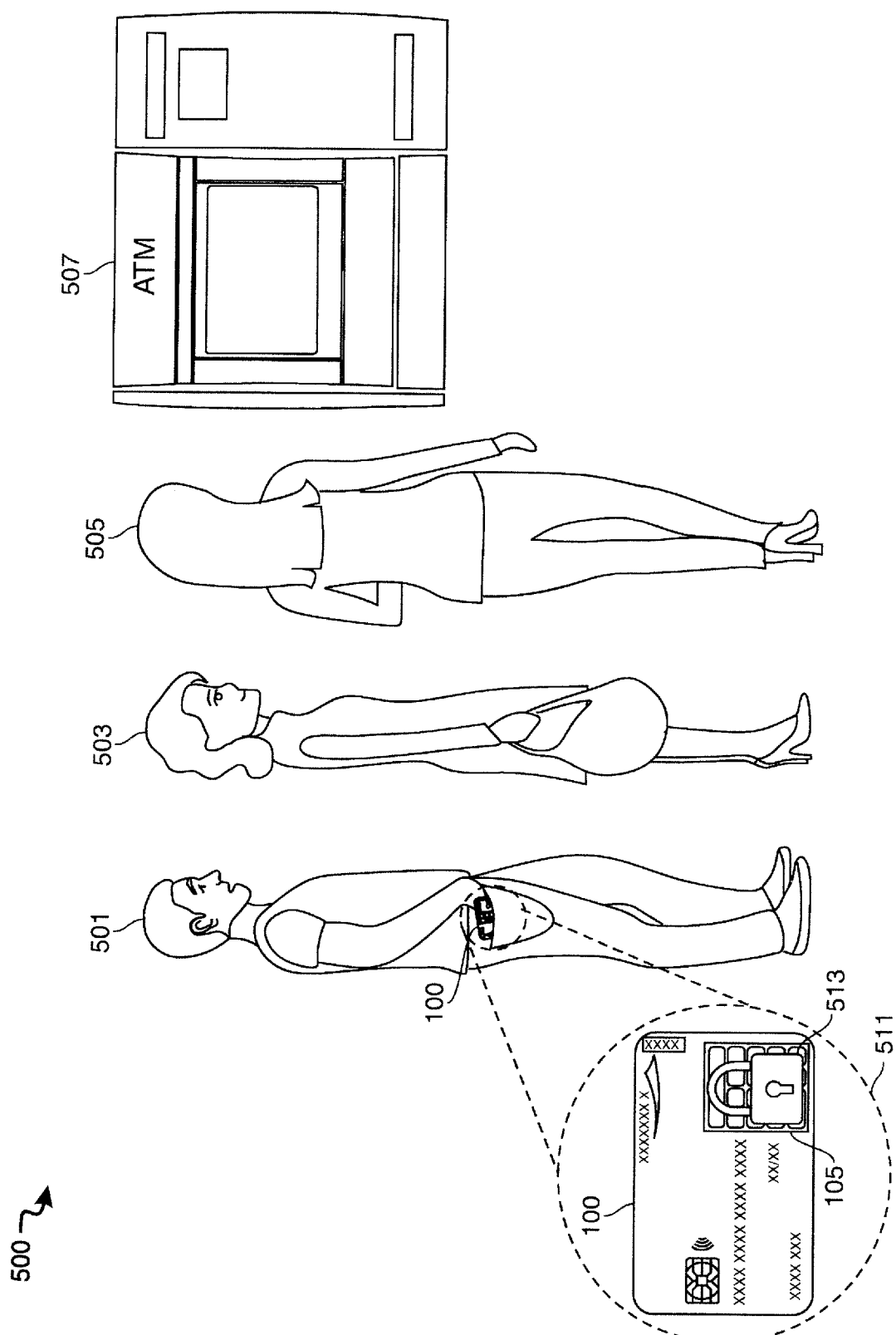
FIG. 5A shows an illustrative apparatus and scenario in accordance with principles of the disclosure.
Figure 5B:
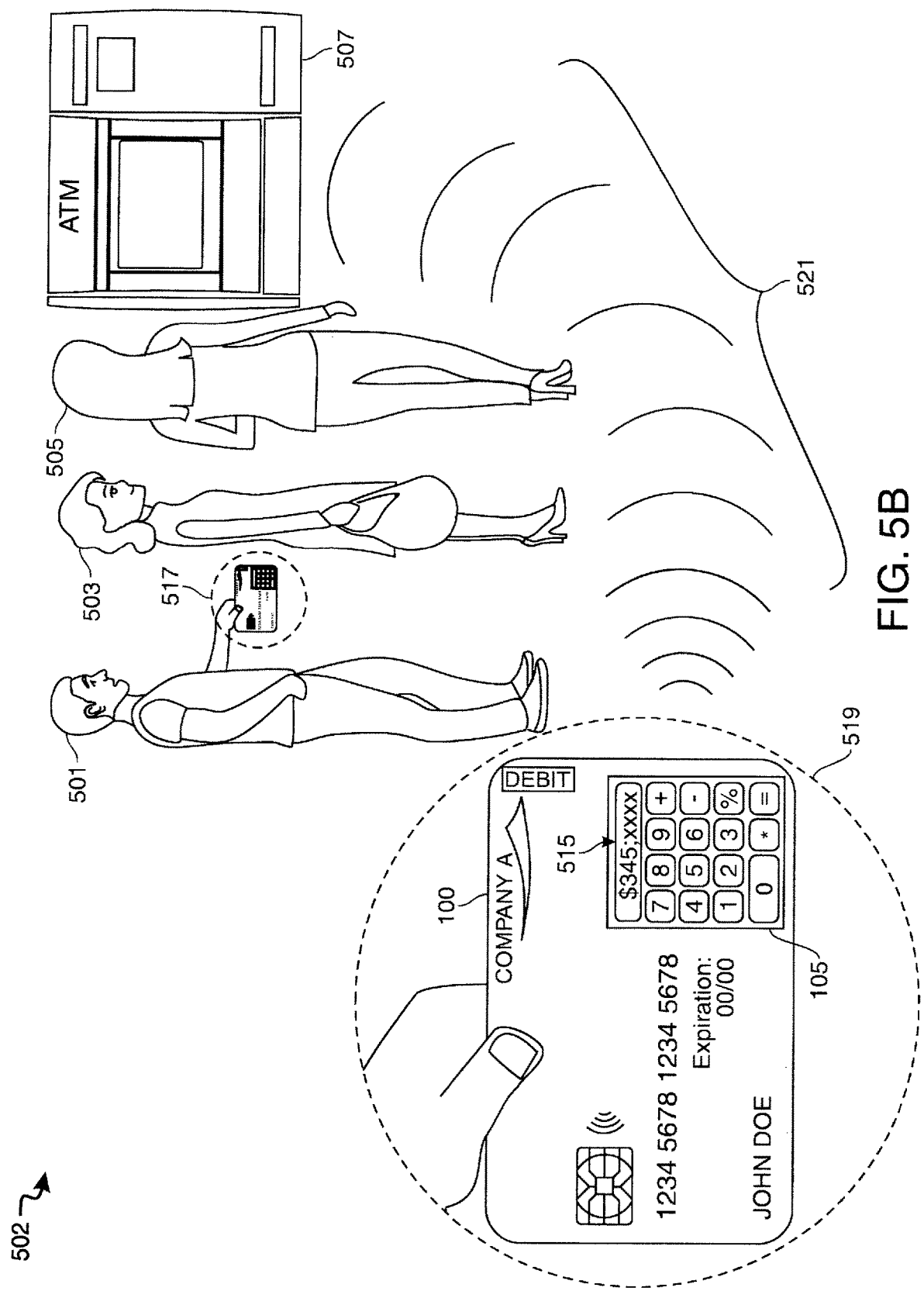
FIG. 5B shows an illustrative apparatus and scenario in accordance with principles of the disclosure.

FIGS. 5A and 5B show illustrative scenarios 500 and 502. FIG. 5A shows scenario 500. In scenario 500, users 501, 503 and 505 are all waiting on a line to use kiosk 507. Scenario 501 shows that user 501 is last on the line. Scenario 500 also shows that user 501 is in possession of smart card 100.

Enlarged view 511 of smart card 100 shows that keypad 105 of smart card 100 is in an inactive state and is locked.

When keypad 105 is inactive, data may not be entered using keypad 105. When keypad 105 is inactive, data entered using keypad 105 may not be stored on smart card 100. In some embodiments, keypad 105 may remain locked until smart card 100 detects that it is within range of a communication channel of kiosk 507.

FIG. 5B shows scenario 502. In scenario 502, while user 501 is waiting on the line, smart card 100 determines it is within range of a communication channel of kiosk 507. Smart card 100 establishes communication channel 521 with kiosk 507. In response to establishing communication channel 521, microprocessor 309 (shown in FIG. 3) unlocks keypad 105. As shown in 517, user 501 may remove smart card 100 and enter transaction or authentication information while waiting for users 503 and 505 to complete their transactions at kiosk 507.

Enlarged view 519 shows illustrative transaction and authentication information 515 entered by user 501 while waiting on a line. Using unlocked keypad 105, user 501 has entered an amount—$345. Using unlocked keypad 105, user 501 has also entered a PIN. The PIN is represented by "xxxx" to prevent an onlooker from viewing the PIN entered by user 501.

Transaction and authentication information 515 may be transferred to kiosk 507 while user 501 is waiting on the line. When user 501 inserts smart card 100 into kiosk 507, information 515 previously entered by user 501 is used to execute a transaction at kiosk 507. Smart card 100 may formulate transaction instructions based on the entered transaction/authentication information 515. A desired transaction may be executed without requiring any inputs from user 501 after smart card 100 was inserted into kiosk 507.

Executing transactions based on information 515 previously entered by user 501 may increase a transaction efficiency of kiosk 507. For example, each of users 503 and 505 may be in possession of a smart card such as smart card 100. Each of users 503 and 505 may enter transaction information using keypad 105 before approaching kiosk 507.

Based on the previously entered information, transactions desired by each of users 503 and 505 may be executed by kiosk 507. The desired transactions may be executed without requiring any additional prompts or inputs from users 503 or 505 after their respective smart cards are inserted into kiosk 507.

As a result of not having to prompt users 501, 503 or 505 for information, kiosk 507 may process transactions desired by users 501, 503 or 505 in less time. Accordingly, users 501, 503 or 505 each wait less time on the line before having their desired transactions executed by kiosk 507.

Figure 6:
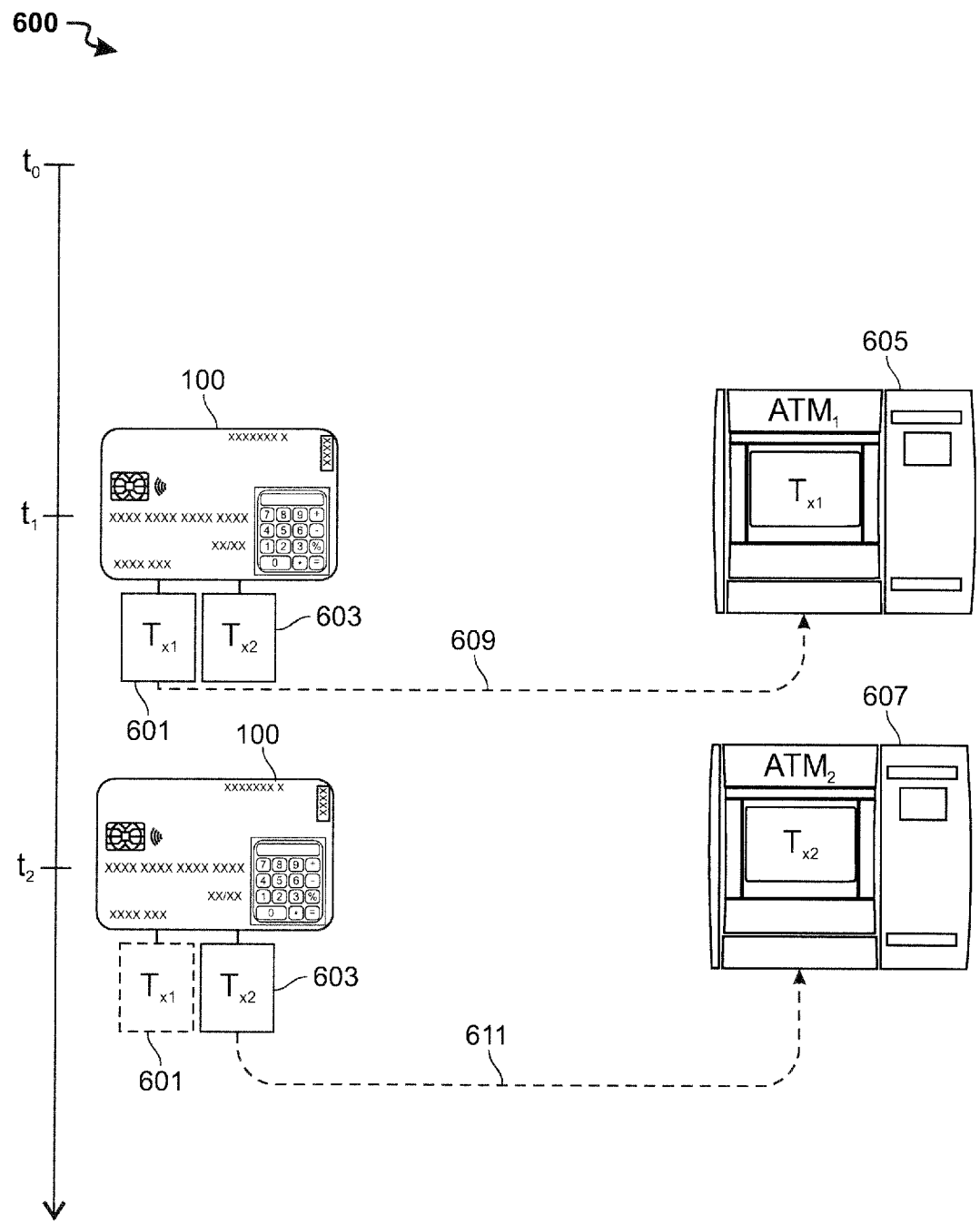
FIG. 6 shows an illustrative apparatus and scenario in accordance with principles of the disclosure.

FIG. 6 shows illustrative scenario 600. In scenario 600, at time $t_1$, smart card 100 locally stores two sets of transaction instructions—601 and 603. Each of transaction instructions 601 and 603 may be associated with timing restrictions. Each of transaction instructions 601 and 603 may be associated with location restrictions. For example, the user may limit transaction instructions 601 to being executed at $t_1$ at kiosk 605. The user may limit transaction instructions 603 to being executed at $t_2$ at kiosk 607.

Scenario 600 shows that at $t_1$, transaction instructions 601 are transferred to kiosk 605 via communication channel 609 for execution. Scenario 600 shows that at $t_2$, transaction instructions 603 are transferred to kiosk 607 via communication channel 611 for execution. At $t_2$, because transaction instructions 601 have already been transferred to kiosk 605 at $t_1$, transaction instructions 601 are shown in phantom lines on smart card 100.

In some embodiments, transaction instructions 601 may be deleted from smart card 100 after being transferred to kiosk 605. For example, kiosk 605 may issue an instruction to smart card 100 to delete transaction instructions 601 after kiosk 605 successfully executes transaction instructions 601.

Thus, methods and apparatus for PRE-STAGING TECHNOLOGY FOR SELF-SERVICE KIOSKS are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for improving transaction processing efficiency of a point-of-sale ("POS") terminal, the system comprising a smart card having a thickness not greater than 0.8 millimeters ("mm") and a surface area not greater than 86 mm×54 mm and comprising:
   a wireless communication interface;
   a microprocessor;
   a user input system in electronic communication with the microprocessor, the user input system comprising:
      a keypad;
      an input controller that captures data entered using the keypad at a first location;
      a voice controller that generates an audio message confirming the data captured by the input controller;
      and an encryption controller that encrypts the data captured by the input controller; and
   executable instructions stored in a non-transitory memory, that when run by the microprocessor:
      formulates transaction instructions for the POS terminal based on the data captured by the input controller;
      configures the wireless interface to detect that the smart card is at a second location and within a wireless communication range of the POS terminal;
      when the smart card is at the second location and within the wireless communication range, initiates a secure communication channel with the POS terminal and selfauthenticates the smart card to the POS terminal; and
      transfers the transaction instructions to the POS terminal and autonomously triggers execution of a purchase transaction at the POS terminal, thereby improving the transaction processing efficiency of the POS terminal;
   wherein the executable instructions stored in the non-transitory memory, when run by the microprocessor:
      transfer the transaction instructions to the POS terminal over the secure communication channel; and
      only autonomously trigger execution of the purchase transaction after establishing contact-based communication with the POS terminal.

2. The smart card of claim 1, the executable instructions stored in the non-transitory memory, when run by the microprocessor configures the voice controller to only produce the audio message when the smart card is within a familiar zone.

3. The system of claim 1 the executable instructions stored in the non-transitory memory, when run by the microprocessor:
   captures first and second data entered using the keypad at the first location;
   formulates first transaction instructions based on the first data captured by the input controller;
   formulates second transaction instructions based on the second data captured by the input controller;
   stores the first and second transaction instructions locally on the smart card;
   transfers the first transaction instructions to a first POS terminal when the smart card is within a wireless communication range of the first POS terminal; and
   transfers the second transaction instructions to a second POS terminal when the smart card is within a wireless communication range of the second POS terminal;
   wherein, the first and second POS terminals are at different locations.

4. The system of claim 1 the executable instructions stored in the non-transitory memory, when run by the microprocessor purges the transaction instructions when the smart card does not transfer the transaction instructions to the POS terminal within a pre-determined time period.

5. The system of claim 1, the POS terminal comprising:
   a front controller that receives the transaction instructions from the wireless interface over the secure communication channel;
   a decryption controller that decrypts the encrypted data;
   an input validation controller that communicates with a remote computer server, validates the encrypted data and confirms that the transaction instructions conform to pre-defined limits associated with the smart card before autonomously triggering execution of the purchase transaction.

6. A smart card that improves transaction processing efficiency of a point-of-sale ("POS") terminal, the smart card comprising:
   a wireless interface;
   a housing;
   a microprocessor embedded in the housing;
   a battery for powering the wireless interface and the microprocessor;
   a keypad mounted on an outside of the housing; and
   executable instructions stored in a non-transitory memory, that when run by the microprocessor:
      detects that the smart card is at least 4 ft. away from the POS terminal;
      activates a uni-directional communication capability of the wireless interface and initiates a limited communication channel for receiving transaction information requested by the POS terminal;
      in response to receiving the request from the POS terminal, determines whether the requested transaction information is pre-authorized by the smart card;
      when the transaction information is preauthorized, activates the keypad and captures data entered using the keypad;
      encrypts the captured data;
      activates a bi-directional communication capability of the wireless interface and initiates a bidirectional communication channel with the POS terminal;
      transmits the encrypted data to the POS terminal; and
      provides transactional confirmation to the POS terminal and autonomously triggers execution of a purchase transaction at the POS terminal using the captured data thereby improving the transaction processing efficiency of the POS terminal.

7. The smart card of claim 6, the captured data comprising:
   a personal identification number ("PIN") associated with the smart card; and
   a zip code or billing address associated with the smart card.

8. The smart card of claim 6, wherein the transactional confirmation is provided to by direct entry into the POS terminal.

9. The smart card of claim 6, wherein the transactional confirmation is provided to the POS terminal by an authentication key sequence entered using the keypad of smart card.

10. The smart card of claim 6, the executable instructions stored in the non-transitory memory, when run by the microprocessor deactivates the wireless interface and the keypad after autonomously triggering the execution of the purchase transaction.

11. The smart card of claim 6, the executable instructions stored in the non-transitory memory, when run by the microprocessor:
- determines that the smart card is within a near field communication ("NFC") range of the POS terminal; and
- only provides the transactional confirmation to the POS terminal when the smart card is within the NFC communication range.

12. The smart card of claim 6, the executable instructions stored in the non-transitory memory, when run by the microprocessor only provides the transactional confirmation to the POS terminal when the smart card is inserted into a card reader of the POS terminal and establishes a contact-based communication channel with the POS terminal.

13. The smart card of claim 6, the executable instructions stored in the non-transitory memory, when run by the microprocessor verifies that the captured data conforms to the transaction information requested by the POS terminal before transmitting the encrypted data to the POS terminal using the bi-directional communication channel.

14. The smart card of claim 6, the executable instructions stored in the non-transitory memory, when run by the microprocessor formulates transaction instructions based on the captured data, wherein:
- the transaction instructions are sufficient to autonomously instruct the POS terminal to execute the purchase transaction without the POS terminal prompting for any additional data after receiving the transaction instructions; and
- the encrypted data comprises the transaction instructions.

15. The smart card of claim 6, wherein the housing and the keypad collectively have a thickness that is not greater than 0.8 millimeters ("mm").

* * * * *